(12) United States Patent
Burdick et al.

(10) Patent No.: US 7,296,232 B1
(45) Date of Patent: Nov. 13, 2007

(54) CALENDAR CONTROL FOR SELECTION OF TIME PERIODS TO FILTER DATA

(75) Inventors: Brian Burdick, Bellevue, WA (US); Abhijit Kundu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 10/113,240

(22) Filed: Apr. 1, 2002

(51) Int. Cl.
*G06F 3/00* (2006.01)

(52) U.S. Cl. .............................. 715/738; 707/3; 707/4; 715/733; 715/736

(58) Field of Classification Search ............ 700/13–16; 715/810, 738, 733, 736; 707/3, 4
See application file for complete search history.

(56) References Cited

U.S. PATENT DOCUMENTS

| | | | | |
|---|---|---|---|---|
| 4,187,629 | A * | 2/1980 | Yamada ........................ 40/109 |
| 5,500,938 | A * | 3/1996 | Cahill et al. ................. 715/856 |
| 5,761,646 | A * | 6/1998 | Frid-Nielsen et al. .......... 705/9 |
| 5,805,444 | A * | 9/1998 | Seymour ...................... 700/16 |
| 5,936,625 | A | 8/1999 | Kahl et al. |
| 5,960,406 | A * | 9/1999 | Rasansky et al. .............. 705/9 |
| 6,009,398 | A * | 12/1999 | Mueller et al. ............. 704/275 |
| 6,018,343 | A | 1/2000 | Wang et al. |
| 6,111,572 | A * | 8/2000 | Blair et al. .................. 715/703 |
| 6,226,577 | B1 * | 5/2001 | Yeo .............................. 701/35 |
| 6,236,396 | B1 * | 5/2001 | Jenson et al. ................ 715/764 |
| 6,266,295 | B1 * | 7/2001 | Parker et al. .................. 368/28 |
| 6,295,092 | B1 * | 9/2001 | Hullinger et al. ........... 348/468 |
| 6,322,366 | B1 * | 11/2001 | Bergan et al. ............... 434/118 |
| 6,323,883 | B1 | 11/2001 | Minoura et al. |
| 6,405,123 | B1 * | 6/2002 | Rennard et al. ............. 701/200 |
| 6,658,093 | B1 * | 12/2003 | Langseth et al. ......... 379/88.17 |
| 6,811,608 | B1 * | 11/2004 | Stewart et al. ................. 117/68 |
| 6,885,734 | B1 * | 4/2005 | Eberle et al. ............. 379/88.01 |
| 7,051,038 | B1 * | 5/2006 | Yeh et al. .................... 707/102 |
| 2002/0013814 | A1 * | 1/2002 | Koto ........................... 709/204 |
| 2002/0016924 | A1 * | 2/2002 | Shah et al. .................. 713/200 |
| 2002/0059258 | A1 * | 5/2002 | Kirkpatrick .................. 707/100 |
| 2002/0099777 | A1 * | 7/2002 | Gupta et al. ................. 709/206 |
| 2002/0111935 | A1 * | 8/2002 | Jones et al. ..................... 707/1 |
| 2003/0036927 | A1 * | 2/2003 | Bowen .......................... 705/4 |
| 2003/0036941 | A1 * | 2/2003 | Leska et al. .................... 705/9 |
| 2003/0154116 | A1 * | 8/2003 | Lofton .......................... 705/8 |
| 2003/0156138 | A1 * | 8/2003 | Vronay et al. .............. 345/772 |
| 2004/0078252 | A1 * | 4/2004 | Daughtrey et al. ............. 705/5 |

OTHER PUBLICATIONS

Carlis et al., "Interactive Visualization of Serial Periodic Data," Proceedings of the 11th Annual ACM Symposium on User Interface Software and Technology, 1998, pp. 29-38, ACM Press, New York, USA.

(Continued)

*Primary Examiner*—Weilun Lo
*Assistant Examiner*—Sara Hanne
(74) *Attorney, Agent, or Firm*—Senniger Powers

(57) ABSTRACT

The invention is directed to filtering data in a database with a calendar user interface. The invention returns data associated with time periods selected by the user. In particular, the calendar user interface provides options to the user to individually select a range or non-contiguous time periods and to specify time periods relative to a current time period where the relative time periods are internally converted to fixed time periods.

27 Claims, 8 Drawing Sheets

OTHER PUBLICATIONS

Mackinlay et al., "Developing Canendar Visualizers for the Information Visualizer," Proceedings of the ACM Symposium on User Interface Software and Technology, 1994, pp. 109-118, ACM Press, New York, USA.

Beard et a., "A Visual Calendar for Scheduling Group Meetings," Proceedings of the Conference on Computer-Supported Cooperative Work, 1990, pp. 279-290, ACM Press, New York, USA.

* cited by examiner

FIGURE 3

DAILY : MAY 28, 2001...JUN 25, 2001

DAILY  MONTHLY  RELATIVE

PLEASE SELECT A RELATIVE DATA RANGE:

● LATEST  [ 1 ▽ ]  DAYS (DAILY TOTALS)

○ LATEST  [ 2 3 4 5 6 7 8 ▽ ]  MONTHS (MONTHLY TOTALS)

OK  CANCEL  HELP

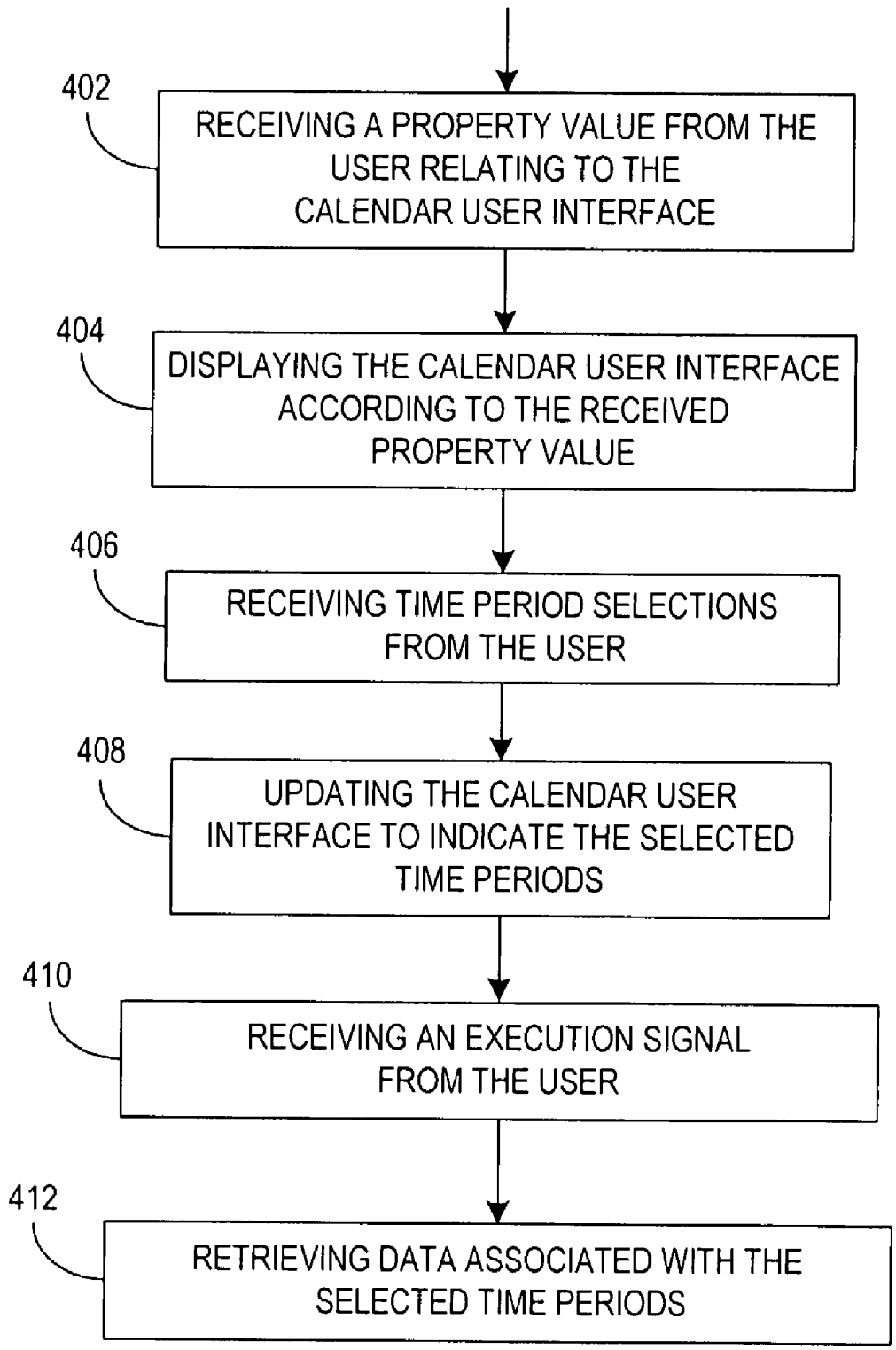

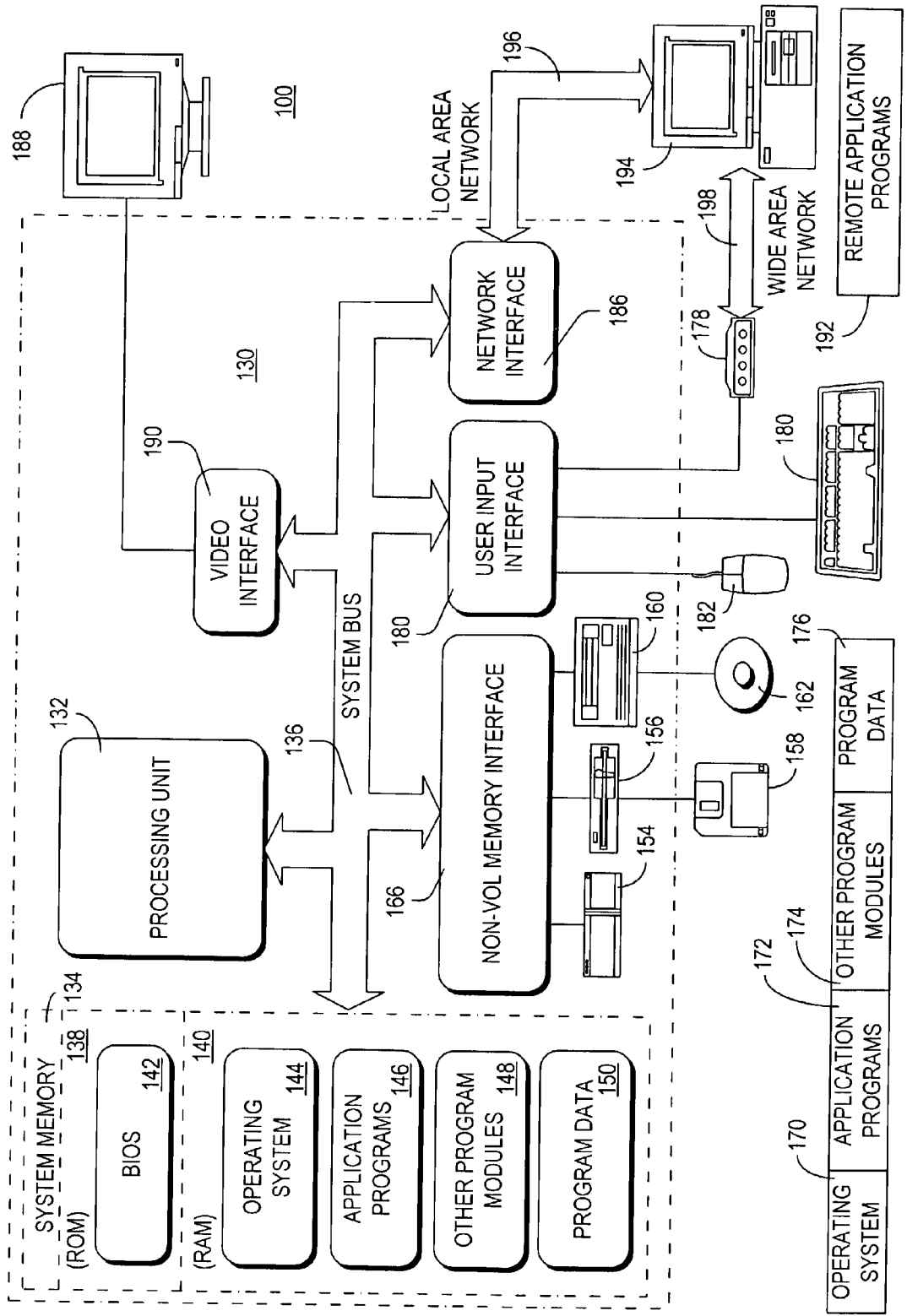

CALENDAR CONTROL FOR SELECTION OF TIME PERIODS TO FILTER DATA

TECHNICAL FIELD

The present invention relates to the field of data filtering. In particular, this invention relates generally to filtering data with a calendar user interface.

BACKGROUND OF THE INVENTION

Databases storing large amounts of data (e.g., a terabyte of data) are difficult to navigate. Some prior art database navigation techniques and data filtering techniques require large amounts of data to be downloaded. For databases in which the data corresponds to one or more dates, a calendar user interface is desired to simplify the navigation and reduce the amount of data downloaded during filtering.

Some prior art calendar user interfaces for filtering data lack the ability to enable or disable a range of dates for user selection even though most operations are valid only for a specific time limit. Further, an entire month cannot be selected by a single user selection in some prior art calendar user interfaces. In these interfaces, a user needs to individually select each day in the month to select the entire month. Similarly, some prior art user interfaces accept an unlimited quantity of selections from the user for filtering data. A large quantity of selections returns a large data set, thereby defeating the filtering attempt.

Some prior art user interfaces require dates to be entered in a specific format. For example, some calendar user interfaces require date entry in the form MM/DD/YYYY while other calendar user interfaces require date entry in the form DD/MM/YYYY. In addition, different calendar user interfaces may reference the months of the year by different names or abbreviations.

Calendar operations such as scheduling a job, an appointment, or automatically running a report each month with the same dates may need dates specified relative to a current date. The prior art calendar user interfaces lack the capability to allow a user to specify relative dates. For example, these prior art user interfaces do not provide the user the ability to specify the first week of each month, the first month of each year, or the first day of each month.

Although some existing calendar user interfaces are based on a hypertext markup language (HTML), they fail to provide options to the user to individually select non-contiguous days, individually select entire months, or specify dates relatively and have the relative dates converted internally to fixed dates. In other words, the user is often forced to sift through unwanted data.

For these reasons, a system for filtering data using a calendar user interface is desired to address one or more of these and other disadvantages.

SUMMARY OF THE INVENTION

The invention is directed to filtering data in a database with a calendar user interface. The invention returns data associated with time periods selected by the user. In particular, the calendar user interface provides options to the user to individually select a range or non-contiguous time periods and to specify time periods relative to a current time period where the relative time periods are internally converted to fixed time periods. The invention internally converts all selected time periods into a common format before performing operations improving its adaptability. In addition, the invention presents a user with a valid range of time periods prior to receiving any selections from the user. The invention also limits the number of selections input by the user prior to filtering data to limit the amount of data retrieved from the database.

In accordance with one aspect of the invention, a method processes data stored in a database. The method includes displaying a calendar user interface to a user. The calendar user interface defines a plurality of time periods. At least one of the time periods has corresponding data stored in the database. The method receives from the user at least one selection of a plurality of the time periods. The selection includes non-contiguous time periods. The method updates the displayed calendar user interface in response to the received selection to indicate the selected time periods. The method further retrieves the data associated with the selected time periods from the database in response to a user command for processing.

In accordance with another aspect of the invention, a method processes data stored in a database. The method includes displaying a calendar user interface to a user. The calendar user interface defines a plurality of time periods. At least one of the time periods has corresponding data stored in the database. The method receives from the user at least one selection of a plurality of the time periods. The selection specifies the selected time periods relative to a current time period. The method updates the displayed calendar user interface in response to the received selection to indicate the selected time periods. The method further retrieves the data associated with the selected time periods from the database in response to a user command for processing.

In accordance with yet another aspect of the invention, a method processes data stored in a database in a computer system having a graphical user interface including a display and a user interface selection device. The method includes receiving from a user at least one property value associated with a calendar user interface. The calendar user interface defines a plurality of time periods. At least one of the time periods has corresponding data stored in the database. The method displays the calendar user interface to a user on the display in accordance with the received property value. Further, the method receives from the user one or more selections corresponding to a plurality of the time periods via the user interface selection device. The selections include non-contiguous time periods. The method alters the calendar user interface on the display in response to the received selections to indicate the selected time periods. The method receives an execution signal from the user via the user interface selection device and retrieves the data associated with the selected time periods from the database for processing in response to the received execution signal.

In accordance with yet another aspect of the invention, a method processes data stored in a database in a computer system having a graphical user interface including a display and a user interface selection device. The method includes receiving from a user at least one property value associated with a calendar user interface. The calendar user interface defines a plurality of time periods. At least one of the time periods has corresponding data stored in the database. The method displays the calendar user interface to a user on the display in accordance with the received property value. Further, the method receives from the user one or more selections corresponding to a plurality of the time periods via the user interface selection device. The user specifies the selected time periods relative to a current time period. The method alters the calendar user interface on the display in response to the received selections to indicate the selected time periods. The method receives an execution signal from the user via the user interface selection device and retrieves the data associated with the selected time periods from the database for processing in response to the received execution signal.

In accordance with yet another aspect of the invention, a computer-readable medium has computer-executable components for processing data stored in a database. The components include a view component, an input component, a verification component, and an execution component. The view component displays a calendar user interface to a user. The calendar user interface defines a plurality of time periods. At least one of the time periods has corresponding data stored in the database. The input component receives from the user at least one selection of a plurality of the time periods. The selection includes non-contiguous time periods and/or specifies the selected time periods relative to a current time period. The verification component updates the displayed calendar user interface in response to the received selection to indicate the selected time periods. The execution component retrieves the data associated with the selected time periods from the database for processing in response to a user command.

In accordance with yet another aspect of the invention, a computer-readable medium stores a data structure for processing data stored in a database. The data structure includes a view field, an input field, a verification field, and an execution field. The view field stores a calendar user interface for display to the user. The calendar user interface represents a plurality of time periods. At least one of the time periods has corresponding data stored in the database. The input field stores at least one selection of a plurality of the time periods. The selection is received from the user. The selection represents non-contiguous time periods and/or represents the selected time periods relative to a current time period. The verification field stores updates to the calendar user interface stored in the view field. The updates are displayed in the calendar user interface in response to the selection received from the user and stored in the input field. The updates are displayed in the calendar user interface to indicate the selected time periods to the user. The execution field stores the data associated with the selected time periods. The data is retrieved from the database for processing in response to a user command.

In accordance with yet another aspect of the invention, a display device has rendered thereon a calendar user interface. The calendar user interface includes a selected range of time periods where at least one of the time periods has corresponding data stored in a database. The calendar user interface also includes at least one selection of a plurality of time periods within the selected range of time periods where the selection includes non-contiguous time periods. The calendar user interface also includes a user command for retrieving, from the database, the data associated with the selection for processing.

Alternatively, the invention may comprise various other methods and apparatuses.

Other features will be in part apparent and in part pointed out hereinafter.

BRIEF DESCRIPTION OF THE DRAWINGS

FIG. 3 is an exemplary embodiment of a relative date selector user interface.

FIG. 4 is a flow chart of one embodiment of the invention illustrating a method for filtering data with a calendar user interface.

FIG. 7 is a block diagram of one embodiment of the invention illustrating one example of a suitable computing system environment on which the invention may be implemented.

Corresponding reference characters indicate corresponding parts throughout the drawings.

BRIEF DESCRIPTION OF THE APPENDIX

Figure 1A:
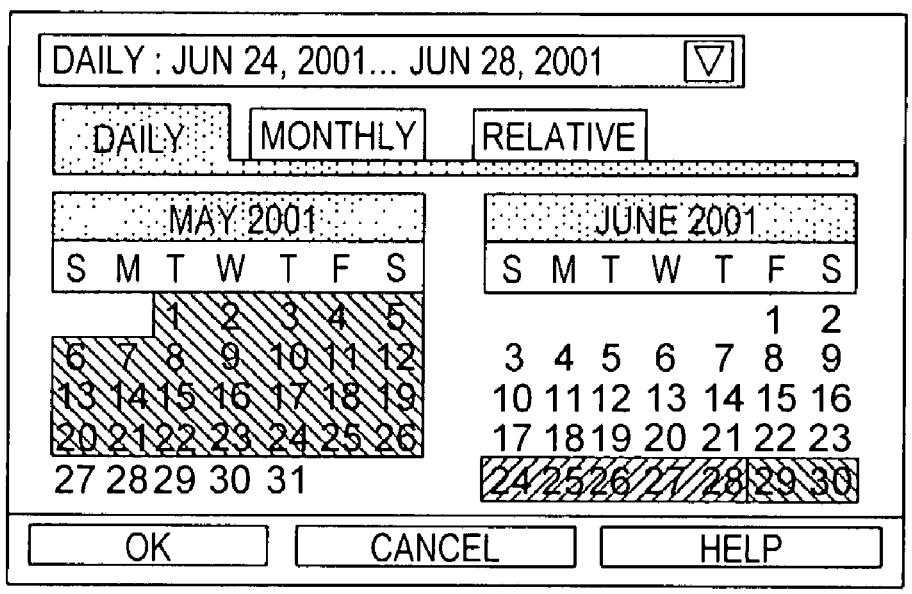
FIG. 1A is an exemplary embodiment of a day selector user interface displaying selected, contiguous time periods.

Appendix A includes a list of exemplary events and exposed properties in the invention including implementation details.

DETAILED DESCRIPTION OF THE INVENTION

The invention provides improved data navigation through a control for a calendar user interface ("the calendar UI") to retrieve or filter a data set stored in a database. As an example, a user may wish to know how many hits a certain web page received on certain days. The statistics for web page access are stored in a database and associated with a particular time period such as an hour, day, week, month, or year. Each datum in the database is associated with one or more dates. The invention receives one or more date selections from the user via the calendar UI and returns a data set representative of the web page hits for the selected dates. By selecting dates via the calendar UI, the invention maintains the selections and retrieves the data set associated with the selections in response to a user command. Those skilled in the art will note that the data in the database could be any data associated with one or more dates including, but not limited to, web site access statistics, financial markets data, company reports, sales data, etc.

In one embodiment, a computer system for processing the data executes software routines to provide the calendar UI of the invention. The UI, which is based on a hypertext markup language (HTML), presents options to the user to individually select one or more days (a range of days or non-contiguous days) or individually select one or more entire months (a range of months or non-contiguous months). The calendar control provided by the UI also allows the user to specify a relative date range (or any other rolling interval) and it internally converts these relative dates to fixed dates. For example, the invention converts a date selection of "the last N days" to "day X to day Y." Similarly, the invention converts a date selection of "the last N months" to "month X to month Y."

The invention exposes properties of the software routines that are configurable by a software developer or other user. For example, the software routines of the invention include properties through which the valid date range can be specified and enabled for selection. In this manner, the calendar UI of the invention enables the user to easily select the grain of data returned by this query. The invention also provides configurable properties to enable/disable tabs that provide selection for days/months or relative dates. Moreover, the invention exposes properties that can be used to specify the maximum number of days or months that can be allowed to be selected by the user. Any selections over the limit are not allowed. See Appendix A for a discussion of exemplary properties configurable by the software developer or other user.

For example, FIGS. 1-3 illustrate aspects of an exemplary calendar UI. The UI may display dates with various background colors to indicate different conditions although the present drawings are in black and white. For example, dates with a gray background are disabled, dates with a navy background are selected, and dates with an ivory background are unselected. In each of FIGS. 1-3, buttons along the bottom of each calendar UI read "ok," "cancel," and "help." Tabs along the top of each calendar UI read "daily," "monthly," and "relative," reflecting the selector UIs available to the user. Examples of these selector UIs are in FIGS. 1-3. When the user selects one of the tabs, the associated selector UI appears to the user on the display.

In one embodiment, a display device such as monitor 188 described with reference to FIG. 7 renders a calendar user interface such as illustrated in FIGS. 1-3. The calendar user interface includes a selected range of time periods where at least one of the time periods has corresponding data stored in a database. The calendar user interface also includes at least one selection of a plurality of time periods within the selected range of time periods where the selection includes non-contiguous time periods. The calendar user interface also includes a user command for retrieving, from the database, the data associated with the selection for processing. In response to selection of a daily tab by the user, the calendar user interface displays each day in the selected range of time periods in the calendar user interface. In response to selection of a monthly tab by the user, the calendar user interface displays each month in the selected range of time periods in the calendar user interface. In response to selection of a relative tab by the user, the calendar user interface displays a selected number of days or months specified relative to a current time period.

Figure 1B:
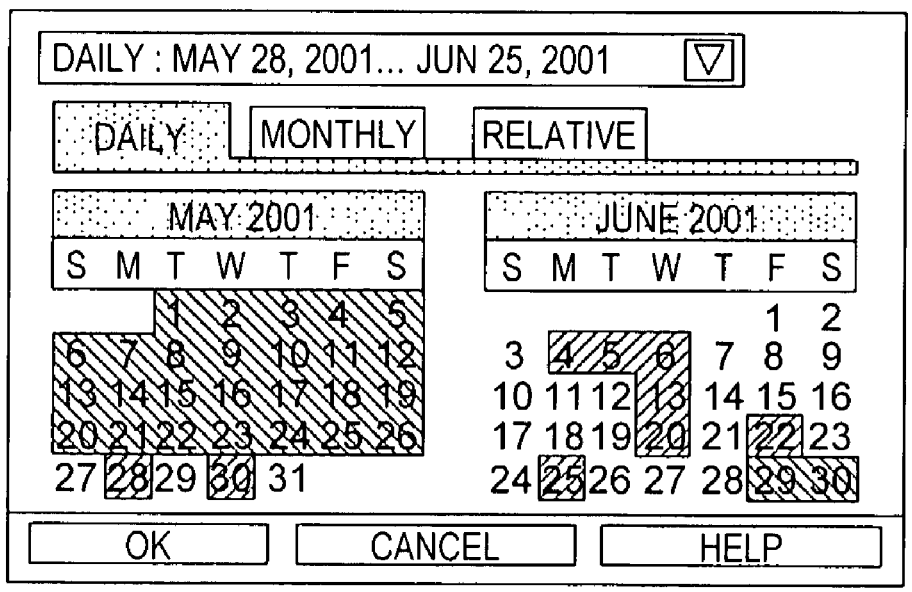
FIG. 1B is an exemplary embodiment of a day selector user interface displaying selected, non-contiguous time periods.

Referring first to FIGS. 1A and 1B, exemplary embodiments of a day selector UI display selected time periods. The calendar UIs for both FIG. 1A and FIG. 1B show all the days in May 2001 and June 2001, with May 1-26 and June 29-30 shown as disabled for selection as indicated by the crosshatch background of those dates. In FIG. 1A, May 27 through June 23 are unselected, while the contiguous date range June 24-28 has been selected as indicated by the crosshatch background of those dates. In another embodiment, the backgrounds of disabled dates and selected dates may be colors such as gray and navy, respectively. In FIG. 1B, the non-contiguous dates of May 28 and May 30, June 4-6, June 13, June 20, June 22, and June 25 have been selected as indicated by the crosshatch background of those dates. The remaining dates displayed in FIG. 1B are unselected.

Figure 2A:
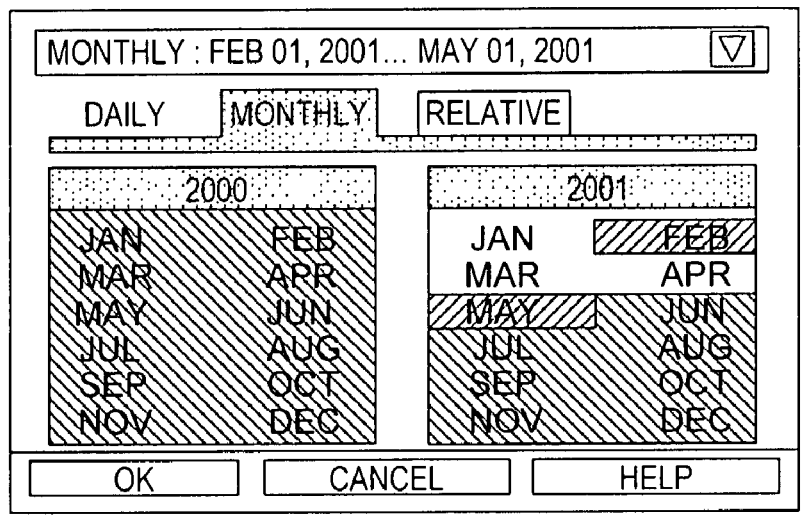
FIG. 2A is an exemplary embodiment of a month selector user interface displaying selected, non-contiguous time periods.
Figure 2B:
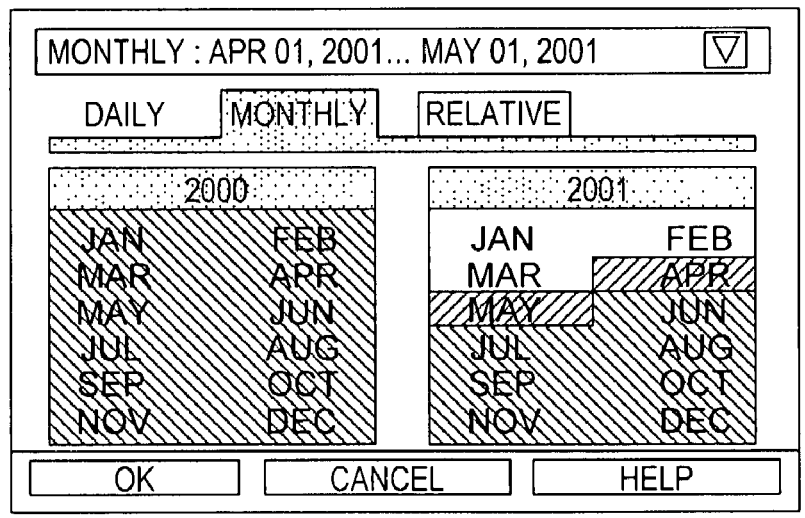
FIG. 2B is an exemplary embodiment of a month selector user interface displaying selected, contiguous time periods.

Referring next to FIGS. 2A and 2B, exemplary embodiments of a month selector UI displays selected time periods. The calendar UIs for both FIG. 2A and FIG. 2B show all the months in 2000 and 2001, with all of 2000 and June 2001 through December 2001 shown as disabled for selection as indicated by the crosshatch background of those months. In FIG. 2A, the non-contiguous months of February 2001 and May 2001 have been selected as indicated by the crosshatch background of those months. The remaining months displayed in FIG. 2A are unselected. In FIG. 2B, the months January 2001 through March 2001 are unselected, while the contiguous date range April 2001 through May 2001 has been selected as indicated by the crosshatch background of those months.

From a usability aspect, the calendar UIs of FIGS. 1 and 2 allow specific selection of dates with the control key on a keyboard and allow range selection with the shift key or by mouse drag which are features included in some computer environments.

Referring next to FIG. 3, an exemplary embodiment of a relative date selector user interface displays date ranges for selection by the user. The selection specifies the selected dates or time periods relative to a current date or time period. For example, the user can select the latest X days or the latest X months, where X is an integer. In a particular example, a user can request to view data associated with the "latest" or "last" two days. The terms "latest" and "last" are converted internally by the invention to a fixed date for generating a query to return the appropriate data set. The user may specify dates relative to the current date when automatically running a report with the same date criteria but for different months.

Those skilled in the art will note that the calendar UI of the invention is not limited to the exemplary UIs of FIGS. 1-3. In particular, the calendar UI of the invention is any UI that allows the user to select any number of any time periods to advantageously select the grain of the data to be processed as a function of the time period. In addition, those skilled in the art will note that the time periods selectable by the user of the invention may include any time period including, but not limited to, years, months, days, hours, and minutes, and seconds.

Referring next to FIG. 4, a flow chart illustrates a method of the invention for processing data stored in a database where the stored data corresponds to one or more time periods. A computer or other computing device executes software of the invention stored on a computer-readable medium to access the database. The computer executes software routines of the invention to provide the calendar UI. Those skilled in the art will note that the database may be one or more databases local to the computer or remotely accessible by the computer via a network such as the Internet. Those skilled in the art will also note that implementation of the software routines of the invention in various ways with various languages are within the scope of the invention. For example, the software routines may be implemented as discrete components, a single application program, object-oriented code, or as an HTML component.

A software routine of the invention receives at least one property value associated with the calendar UI from the user at 402 via a user interface selection device or other input device such as described with reference to FIG. 7. The calendar UI is displayed by a software routine of the invention to the user at 404 in accordance with the received property value via a display such as described with reference to FIG. 7. If a software routine of the invention determines the property value to be invalid, the invention displays an error message to the user. See Appendix A for a list of exemplary events and exposed properties in the invention including implementation details.

The calendar UI defines one or more time periods. The invention receives from the user at least one selection of a plurality of the time periods at 406. In one embodiment, the invention disables further selection by the user if the quantity of selected time periods exceeds a threshold value to limit the amount of data retrieved or downloaded by the user. In this embodiment, the invention constrains the selection to implement cost control. For example, the invention limits the maximum quantity of dates that can be selected to avoid generating a query that will return the entire data set. Further, the invention may limit the maximum result set to be returned by the query. The user can specify these constraints via properties associated with the invention.

The selection may include non-contiguous or contiguous time periods. In addition, the user can select a time period by specifying the time period relative to a current time period. For example, in FIG. 3, the user can specify the latest X days or the latest X months, where X is an integer value. The invention updates, alters, or otherwise changes the displayed calendar user interface at 408 in response to the received selection to indicate the selected time periods to the user. In one embodiment, updating the displayed calendar user interface includes modifying a color associated with the selected time periods in the calendar UI. For example, as in FIGS. 1-3, the invention may change the background color of each selected date to indicate the selected status of the date. After the user has completed date selection, the user sends an execution signal or otherwise issues a command to the invention at 410 to retrieve the data associated with the selected dates. For example, the invention may include an "OK" button which is selected by the user after completing date selection. The invention retrieves the data associated with the selected time periods from the database at 412 in response to the user signal or command.

In one embodiment, the invention is implemented in a computer system having a graphical user interface including a display and a user interface selection device or other input device. One or more computer readable media have computer-executable instructions for performing the operations illustrated in FIG. 4.

Figure 5A:
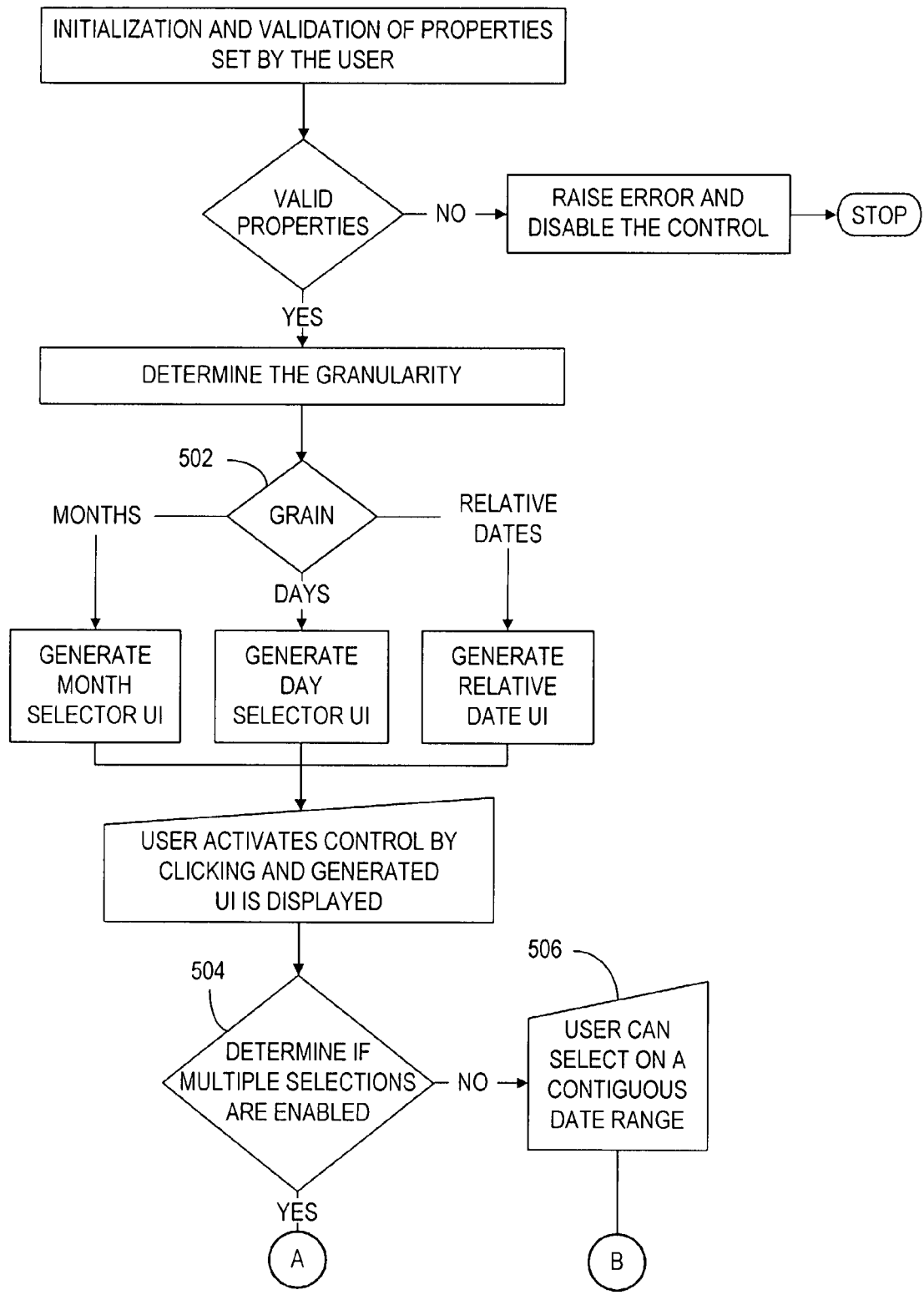
FIG. 5 is a flow chart of another embodiment of the invention illustrating a method for filtering data with a calendar user interface.
Figure 5B:
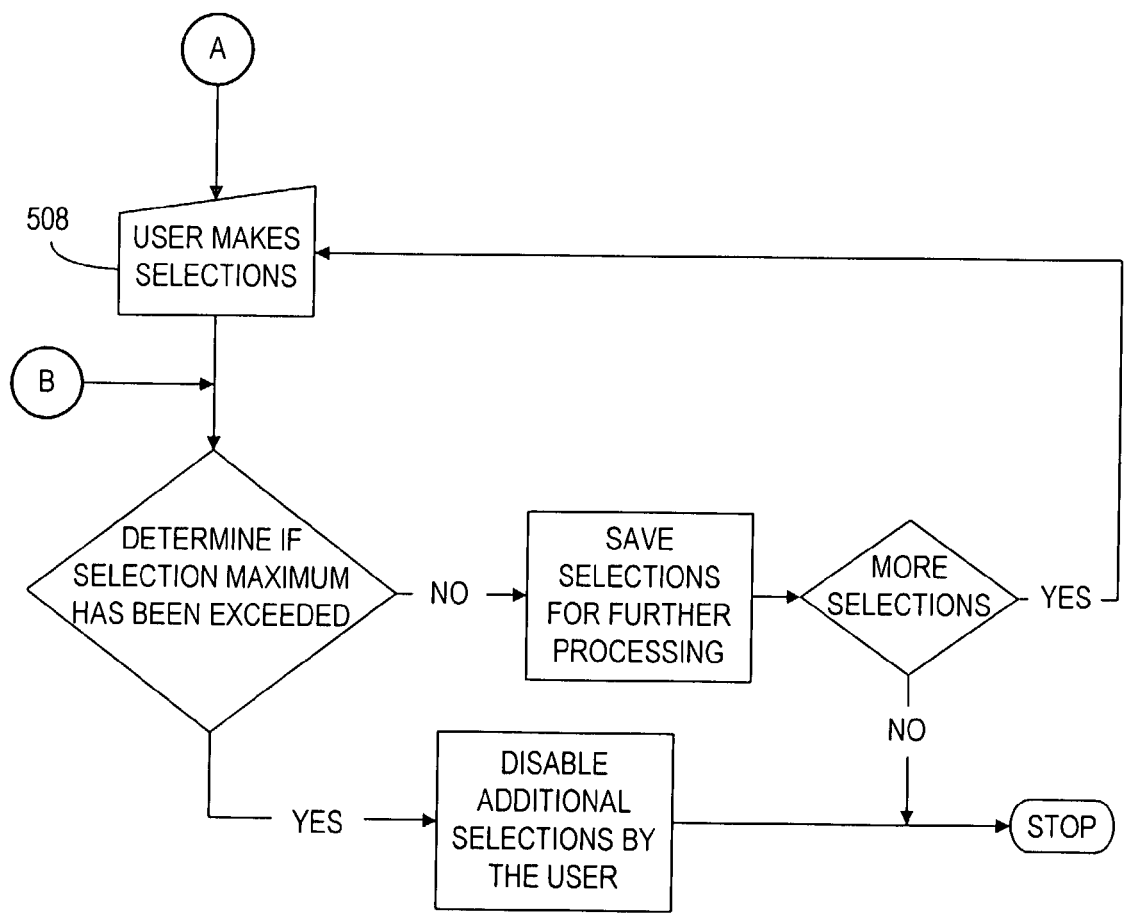

Referring next to FIG. 5, a flow chart illustrates another aspect of the invention for filtering data with a calendar user interface. Expanding on FIG. 4, FIG. 5 illustrates functionality of the invention allowing the user to select a granularity of the UI at 502. In the exemplary flow chart of FIG. 5, the granularity is a day, month, or relative date. In addition, FIG. 5 illustrates functionality of the invention allowing the user to enable multiple selections at 504. If multiple selections are disabled, the user can select only a single contiguous date range at 506. If multiple selections are enabled, the user can select multiple, non-contiguous date ranges at 508.

Figure 6:
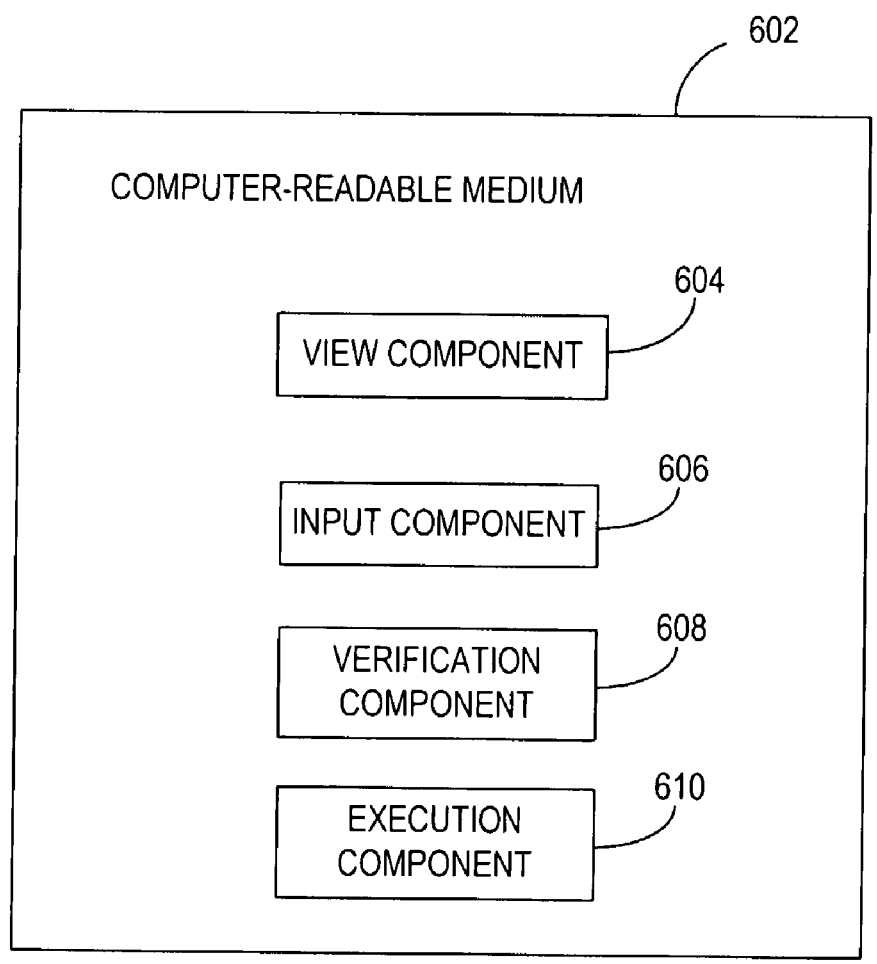
FIG. 6 is a block diagram of one embodiment of the invention illustrating an exemplary computer-readable medium on which the invention may be stored.

Referring next to FIG. 6, a computer-readable medium 602 has computer-executable components for processing data stored in a database. The data corresponds to one or more time periods. The components include a view component 604, an input component 606, a verification component 608, and an execution component 610. The computer executing the view component 604 displays a calendar user interface to a user. The calendar user interface defines one or more time periods. Using conventional input devices, the user selects from the UI. The input component 606 receives from the user at least one selection of a plurality of the time periods. The selection includes non-contiguous time periods. Alternatively, the selection specifies the selected time periods relative to a current time period. The verification component 608 updates the displayed calendar user interface in response to the received selection to indicate the selected time periods. The execution component 610 retrieves the data associated with the selected time periods from the database in response to a user command.

In one embodiment, the window control of the invention is based on a hypertext markup language. The control uses the popup object of any browser to display the actual control thus not actually consuming screen space by overlapping a window over existing text when it is activated and hiding itself as soon as the user changes the focus. The popup objects are part of any standard browser installation so a user need not download any new component to enable the control except a component file embodying the invention which exposes the object model to the browser. In another embodiment, the invention is developed using Java as a language and exposing it as an applet that would run on any browser.

The data in the database is organized or aggregated into tables in another embodiment. The invention dynamically generates a query based on the selected dates and submits the generated query to the appropriate database table. The query returns the relevant data set. The query is any relational database query (e.g., SQL) operating on any relational database. For example, if the user selects one or more entire months, an appropriate query is generated and sent to a monthly data table in the database. In the monthly data table, the data is organized according to months. In another example, if the user selects certain days within one or more months, an appropriate query is generated and sent to a daily data table. In the daily table, the data is organized according to days.

In an alternative embodiment of FIG. 6, the computer-readable medium 602 stores a data structure for processing data stored in a database. The data structure includes fields corresponding to the components illustrated in FIG. 6. That is, a view field corresponds to the view component 604, an input field corresponds to the input component 606, a verification field corresponds to the verification component 608, and an execution field corresponds to the execution component 610. The view field stores a calendar user interface for display to the user. The calendar user interface represents a plurality of time periods where at least one of the time periods corresponds to data stored in the database. The input field stores at least one selection received from the user of a plurality of the time periods. The selection represents non-contiguous time periods and/or represents the selected time periods relative to a current time period. The verification field stores updates to the calendar user interface stored in the view field. The updates are displayed in the calendar user interface in response to the selection received from the user and stored in the input field. The updates are displayed in the calendar user interface to indicate the selected time periods to the user. The execution field stores the data associated with the selected time periods. A computer associated with the user such as computer 130 (see FIG. 7) retrieves the data from the database for processing in response to a user command. For example, the user command may be the user selecting an "ok" button associated with the calendar user interface. In a further example, in response to the user command, computer 130 retrieves data corresponding to statistics for web site access from the database and displays the retrieved data to the user.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 6 to process data stored in a database. In particular, computer 130 executes computer-executable instructions to receive from a user at least one property value associated with a calendar user interface. The calendar user interface defines a plurality of time periods where at least one of the time periods has corresponding data stored in the database. The computer-executable instructions display the calendar user interface to a user on the display in accordance with the received property value and receive from the user one or more selections corresponding to a plurality of the time periods via the user interface selection device. The selections include non-contiguous time periods. Alternatively, the user specifies the selected time periods relative to a current time period. In response to the received selections, the computer-executable instructions alter the calendar user interface on the display to indicate the selected time periods. The computer-executable instructions receive an execution signal from the user via the user interface selection device and retrieve the data associated with the selected time periods from the database for processing.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

APPENDIX A

Details about exemplary events and exposed properties in the invention including implementation details are described in this Appendix A. An exposed event entitled "Onchange" is a way for the consumer to determine whether the state of the calendar control has been changed by the user either selecting or unselecting any dates on the calendar control. On any of these operations, the control updates some of its exposed properties. A software developer or other user can write an event handler to get the current state of properties like Value, Info, and Grain (see below). This event can also be further extended to do any custom action for the client based on the current values of these and other properties.

The exemplary calendar control of the invention exposes various methods. A write-only TypeAllowed method takes a series of name/value pairs separated by a semi-colon to identify which types of dates should be allowed in the calendar. A typical value for this property may appear as the following.

DAY=Daily;MONTH=Monthly;RELATIVE=Relative Dates

The calendar internally uses the Name for identifying the current Grain of selection and uses the value to display as a text on the Calendar tab. Based on the TypeAllowed property, the calendar will either enable or disable the options to allow users to select days, months or relative dates.

A write-only Multiple property is a Boolean property that defines whether the user is allowed to select multiple dates. Some operations can be valid for a single date in which cases setting this property as false will prevent the user from any more selections. If the user selects another date, the previous selected date is removed from the selection and current selection is updated. A write-only StartDate property takes a valid date which defines the starting date for the range of dates that should be enabled for user selection. A write-only EndDate property takes a valid date which defines the ending date for the range of dates enabled for user selections. A write-only StartMonth property takes a valid date defining the starting month for the range of months that should be enabled for user selection. A write-only EndMonth property takes a valid date defining the ending month for the range of months that will be enabled for user selection.

A write-only MaxDays property defines the maximum number of days a user is allowed to select on the calendar. The property value should be set based on the performance of the backend server. If the backend server is not able to handle large amounts of dates, this property should be set with a small number. For example, setting this property with "10" will allow the user to select a maximum of ten continuous or individual days. A write-only MaxMonths property defines the maximum amount of months a user is allowed to select on the calendar. The property value should be set based on the performance of the backend server. If the backend server is not able to handle large amounts of dates, this property should be set with a small number. For example, setting this property with a value of "5" will allow the user to select a maximum of five continuous or individual months.

The exemplary calendar control exposes three properties which are readable and writeable by the software developer or other user to both set an initial list of selected dates as well to get the current list of dates selected via the calendar UI. A read-write Value property is a set of dates separated by semicolon. Based on a Grain property value (see below), the calendar control will interpret the Value property value as a selected set of days or months. The read-write Grain property can be set with a value to identify whether the values set into the Value property are days or months. This value should match with the name specified in the value of the Typeallowed property. A mismatch will raise an error dialog from the calendar control. For example, if the TypeAllowed property has a value of "DAY=Daily;MONTH=Monthly" then Grain can have a value of "DAY" or "MONTH".

A read-write Info property formats the current date selections and returns the current minimum date and the maximum month selected along with the grain in a descriptive format that can be displayed as informative text to the user.

What is claimed is:

1. A method for processing data stored in a database associated with a server, said method comprising:
   displaying a calendar user interface to a user, said calendar user interface defining a plurality of time periods, at least one of said time periods having data stored in the database corresponding thereto;
   receiving from the user at least a first selection and a second selection of the plurality of time periods, said first selection comprising individually selected starting and ending times, said second selection comprising individually selected starting and ending times, wherein said first selection and said second selection are non-contiguous time periods;
   modifying the selections as a function of the cumulative time;
   enabling further selections if the cumulative time of the selected time periods does not exceed a maximum amount of time based on the server performance;
   disabling further selections if the cumulative time of the selected time periods exceeds a maximum amount of time based on the server performance;
   updating the displayed calendar user interface in response to the received selections to indicate the selected time periods;
   generating a query based on the selected time periods in response to a user command; and
   submitting the query to the database to retrieve non-calendar data associated with the selected time periods from the database for processing, wherein the database is aggregated into tables based on the selected time periods and wherein the generated query is submitted to the corresponding aggregated table of the database based on the selected time periods.

2. The method of claim 1, wherein at least one of the selections specifies the selected time periods relative to a current time period.

3. The method of claim 1, further comprising receiving at least one property value associated with the calendar user interface from a user, wherein displaying comprises displaying the calendar user interface in accordance with the received property value.

4. The method of claim 3, further comprising displaying an error message to the user if the property value is invalid.

5. The method of claim 1, wherein the calendar user interface is one or more of the following: a day selector user interface, a month selector user interface, and a relative date selector user interface.

6. The method of claim 1, wherein the time periods are selected from a group consisting of one or more months, weeks, days, or hours.

7. The method of claim 1, wherein updating the displayed calendar user interface comprises providing a visual indication to the user confirming the selections of the time periods.

8. The method of claim 7, wherein the visual indication comprises modifying a color associated with a display of the selected time periods.

9. The method of claim 1, wherein the non-calendar data corresponds to statistics for web site access.

10. One or more computer readable storage media having computer-executable instructions for performing the method recited in claim 1.

11. A method for processing data stored in a database, said database associated with a server, said method comprising:
    displaying a calendar user interface to a user, said calendar user interface defining a plurality of time periods, at least one of said time periods having data stored in the database corresponding thereto;
    receiving from the user at least one selection of a plurality of the time periods, said selection specifying the selected time periods relative to a current time period, wherein the selected time periods begin with the current time period or wherein the selected time periods end with the current time period, said selection representing individually selected non-contiguous time periods;
    modifying the selections as a function of the cumulative time;
    enabling further selections if the cumulative time of the selected time periods does not exceed a maximum amount of time based on the server performance;
    disabling further selections if the cumulative time of the selected time periods exceeds a maximum amount of time based on the server performance;
    updating the displayed calendar user interface in response to the received selection to indicate the selected time periods;
    generating a query based on the selected time periods in response to a user command; and
    submitting the query to the database to retrieve non-calendar data associated with the selected time periods from the database for processing, wherein the database is aggregated into tables based on the selected time periods and wherein the generated query is submitted to the corresponding aggregated table of the database based on the selected time periods.

12. The method of claim 11, wherein the time periods are selected from a group consisting of one or more months, weeks, days, or hours.

13. In a computer system having a graphical user interface including a display and a user interface selection device, a method for processing data stored in a database associated with a server, said method comprising:

receiving from a user at least one property value associated with a calendar user interface, said calendar user interface defining a plurality of time periods, at least one of said time periods having data stored in the database corresponding thereto;

displaying the calendar user interface to a user on the display in accordance with the received property value;

receiving from the user at least a first selection and a second selection corresponding to the plurality of time periods via the user interface selection device, said first selection comprising individually selected starting and ending times, wherein said first selection and said second selection are non-contiguous time periods;

modifying the selections as a function of the cumulative time;

enabling further selections if the cumulative time of the selected time periods does not exceed a maximum amount of time based on the server performance;

disabling further selections if the cumulative time of the selected time periods exceeds a maximum amount of time based on the server performance;

altering the calendar user interface on the display in response to the received selections to indicate the selected time periods;

receiving an execution signal from the user via the user interface selection device;

generating a query based on the selected time periods in response to execution signal; and submitting the query to the database to retrieve non-calendar data associated with the selected time periods from the database for processing, wherein the database is aggregated into tables based on the selected time periods and wherein the generated query is submitted to the corresponding aggregated table of the database based on the selected time periods.

14. The method of claim 13, wherein at least one of the selections specifies the selected time periods relative to a current time period.

15. The method of claim 13, wherein the non-calendar data corresponds to statistics for web site access.

16. The method of claim 13, wherein the time periods are selected from a group consisting of one or more months, weeks, days, or hours.

17. One or more computer readable storage media having computer-executable instructions for performing the method recited in claim 13.

18. In a computer system having a graphical user interface including a display and a user interface selection device, a method for processing data stored in a database associated with a server, said method comprising:

receiving from a user at least one property value associated with a calendar user interface, said calendar user interface defining a plurality of time periods, at least one of said time periods having data stored in the database corresponding thereto;

displaying the calendar user interface to the user on the display in accordance with the received property value;

receiving from the user one or more selections corresponding to a plurality of the time periods via the user interface selection device, said selections specifying the selected time periods relative to a current time period, wherein the selected time periods begin with the current time period or wherein the selected time periods end with the current time period, said selections representing individually selected non-contiguous time periods;

modifying the selections as a function of the cumulative time;

enabling further selections if the cumulative time of the selected time periods does not exceed a maximum amount of time based on the server performance;

disabling further selections if the cumulative time of the selected time periods exceeds a maximum amount of time based on the server performance;

altering the calendar user interface on the display in response to the received selections to indicate the selected time periods;

receiving an execution signal from the user via the user interface selection device; and generating a query based on the selected time periods in response to execution signal; and submitting the query to the database to retrieve non-calendar data associated with the selected time periods from the database for processing, wherein the database is aggregated into tables based on the selected time periods and wherein the generated query is submitted to the corresponding aggregated table of the database based on the selected time periods.

19. The method of claim 18, wherein the time periods are selected from a group consisting of one or more months, weeks, days, or hours.

20. A computer-readable storage medium having computer-executable components for processing data stored in a database associated with a server, said components comprising:

a view component for displaying a calendar user interface to a user, said calendar user interface defining a plurality of time periods, at least one of said time periods having data stored in the database corresponding thereto;

an input component for receiving from the user at least one selection of a plurality of the time periods, said selection comprising at least one of the following: (1) individually selected non-contiguous time periods, and (2) selected time periods relative to a current time period, said input component excluding further selected time periods if the cumulative time of further selected time periods exceeds a maximum amount of time based on the server performance, said input component allowing further selected time periods if the cumulative time of further selected time periods does not exceed a maximum amount of time based on the server performance, wherein the selected time periods relative to a current time period begin with the current period or wherein the selected time periods relative to a current time period end with the current time period;

a verification component for updating the displayed calendar user interface in response to the received selection to indicate the selected time periods; and an execution component for generating a query retrieving non-calendar data associated with the selected time periods from the database for processing in response to a user command, wherein the database is aggregated into tables based on the selected time periods and wherein the generated query is submitted to the corresponding aggregated table of the database based on the selected time periods.

21. The computer-readable storage medium of claim 20, wherein the time periods are selected from a group consisting of one or more months, weeks, days, or hours.

22. A computer-readable storage medium having stored thereon a data structure for processing data stored in a database associated with a server comprising:

a view field storing a calendar user interface for display to the user, said calendar user interface representing a plurality of time periods, at least one of said time periods having data stored in the database corresponding thereto;

an input field storing at least one selection of a plurality of the time periods, said selection received from the user, said selection representing at least one of the following: (1) individually selected non-contiguous time periods, and (2) selected time periods relative to a current time period, said selections being limited as a function of a maximum cumulative amount of time of the selected time periods based on the server performance, wherein the selected time periods relative to a current time period begin with the current period or wherein the selected time periods relative to a current time period end with the current time period;

a verification field storing updates to the calendar user interface stored in the view field, said updates displayed in the calendar user interface in response to the selection received from the user and stored in the input field, said updates displayed in the calendar user interface to indicate the selected time periods to the user; and an execution field storing non-calendar data associated with the selected time periods, said non-calendar data returned from a query submitted to the database for processing, said query being generated in response to a user command, wherein the database is aggregated into tables based on the selected time periods and wherein the generated query is submitted to the corresponding aggregated table of the database based on the selected time periods.

23. The computer-readable storage medium of claim 22, wherein the data corresponds to statistics for web site access.

24. A display device having rendered thereon a calendar user interface, said calendar user interface comprising:

at least a first selected range of time periods and a second selected range of time periods, said first and second selected ranges having data stored in a database corresponding thereto, said database being associated with a server, wherein further selection of time periods is prevented if the cumulative time of the selected range of time periods exceeds a maximum amount of time based on expected performance capabilities of the server and further selection of time periods is allowed if the cumulative time of the selected range of time periods does not exceed a maximum amount of time based on expected performance capabilities of the server;

wherein the first selected range of time periods comprises individually selected starting and ending times, wherein the second selected range of time periods comprises individually selected starting and ending times, and wherein the first and the second selected ranges of time periods are non-contiguous time periods; and a user command for generating a query to retrieve, from the database, non-calendar data associated with the at least one selection for processing, wherein the database is aggregated into tables based on the selected range of time periods and wherein the generated query is submitted to the corresponding aggregated table of the database based on the selected range of time periods.

25. The display device of claim 24, further comprising a daily tab for displaying each day in the selected ranges of time periods in the calendar user interface in response to selection of the daily tab by the user.

26. The display device of claim 24, further comprising a monthly tab for displaying each month in the selected ranges of time periods in the calendar user interface in response to selection of the monthly tab by the user.

27. The display device of claim 24, further comprising a relative tab for displaying a selected number of days or months specified relative to a current time period in response to selection of the relative tab by the user.

\* \* \* \* \*